US009170709B2

(12) United States Patent
Han et al.

(10) Patent No.: US 9,170,709 B2
(45) Date of Patent: Oct. 27, 2015

(54) APPARATUS AND METHOD FOR PROVIDING USER INTERFACE (75) Inventors: Jae-uk Han, Osan-si (KR); Ju-il Eom, Suwon-si (KR); Jung-kun Lee, Suwon-si (KR); Ji-su Jung, Chungcheongbuk-do (KR); Da-hye Park, Suwon-si (KR); Bo-mi Kim, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 324 days.

(21) Appl. No.: 13/029,815

(22) Filed: Feb. 17, 2011

(65) Prior Publication Data
US 2011/0202838 A1 Aug. 18, 2011

(30) Foreign Application Priority Data

Feb. 17, 2010 (KR) .................. 10-2010-0014248
Feb. 17, 2010 (KR) .................. 10-2010-0014249

(51) Int. Cl.
G06F 3/048 (2013.01)
G06F 3/0482 (2013.01)
G06F 3/0346 (2013.01)
G06F 3/0481 (2013.01)

(52) U.S. Cl.
CPC ............ *G06F 3/0482* (2013.01); *G06F 3/0346* (2013.01); *G06F 3/04812* (2013.01)

(58) Field of Classification Search
CPC .. G06F 3/0482; G06F 3/0346; G06F 3/04812
USPC .................. 715/701, 858, 861, 834, 830, 831
See application file for complete search history.

(56) References Cited

U.S. PATENT DOCUMENTS

| 6,211,921 | B1 | 4/2001 | Cherian et al. | |
| 2002/0130838 | A1* | 9/2002 | Feierbach | ...................... 345/157 |
| 2005/0086611 | A1* | 4/2005 | Takabe et al. | .................. 715/823 |
| 2006/0095867 | A1* | 5/2006 | Rogalski et al. | .............. 715/858 |
| 2007/0136681 | A1 | 6/2007 | Miller | |
| 2007/0220444 | A1 | 9/2007 | Sunday et al. | |
| 2007/0262957 | A1* | 11/2007 | Seon | .............................. 345/157 |
| 2008/0174551 | A1 | 7/2008 | Ishibashi | |
| 2008/0184118 | A1 | 7/2008 | Yun et al. | |
| 2008/0184324 | A1 | 7/2008 | Yun et al. | |
| 2008/0189630 | A1 | 8/2008 | Kondo et al. | |
| 2008/0250349 | A1* | 10/2008 | Peiro et al. | ..................... 715/810 |

(Continued)

FOREIGN PATENT DOCUMENTS

| JP | 08297543 | 11/1996 |
| JP | 2006-186868 | 7/2006 |

(Continued)

*Primary Examiner* — Kieu Vu
*Assistant Examiner* — Aaron Lowenberger
(74) *Attorney, Agent, or Firm* — The Farrell Law Firm, P.C.

(57) ABSTRACT

A method of providing a user interface, including receiving a motion signal from a pointing device including a pointing function for moving a pointer, while the pointer is not generated on a display screen; generating the pointer when it is determined, based on the received motion signal, that the pointing device is moved in a predetermined form; displaying the generated pointer on the display screen; and providing a menu on at least one corner of the display screen.

35 Claims, 10 Drawing Sheets

(56) References Cited

U.S. PATENT DOCUMENTS

| | | | |
|---|---|---|---|
| 2009/0037813 A1* | 2/2009 | Newman et al. | 715/702 |
| 2009/0153475 A1* | 6/2009 | Kerr et al. | 345/157 |
| 2009/0160764 A1 | 6/2009 | Myllymaki | |
| 2009/0252311 A1* | 10/2009 | Kuiken | 379/102.02 |
| 2009/0327964 A1* | 12/2009 | Mouilleseaux et al. | 715/834 |
| 2010/0146451 A1* | 6/2010 | Jun-Dong et al. | 715/841 |
| 2010/0281374 A1* | 11/2010 | Schulz et al. | 715/723 |
| 2010/0302151 A1* | 12/2010 | Bae et al. | 345/158 |
| 2010/0333029 A1* | 12/2010 | Smith et al. | 715/834 |
| 2011/0090407 A1* | 4/2011 | Friedman | 348/734 |

FOREIGN PATENT DOCUMENTS

| | | |
|---|---|---|
| JP | 2007-052385 | 3/2007 |
| JP | 2007-066080 | 3/2007 |
| JP | 2008-181199 | 8/2008 |
| JP | 4262693 | 5/2009 |
| JP | 2009-301564 | 12/2009 |
| KR | 1020040078190 | 9/2004 |
| KR | 1020050122859 | 12/2005 |
| KR | 1020080070422 | 7/2008 |
| KR | 1020090041563 | 4/2009 |
| KR | 100907791 B1 | 7/2009 |

* cited by examiner

APPARATUS AND METHOD FOR PROVIDING USER INTERFACE

PRIORITY

This application claims priority under 35 U.S.C. §119(e) to Korean Patent Application No. 10-2010-0014248, filed on Feb. 17, 2010, and Korean Patent Application No. 10-2010-0014249, filed on Feb. 17, 2010 in the Korean Intellectual Property Office, the entire disclosures of which are incorporated herein in by reference.

BACKGROUND OF THE INVENTION

1. Field of the Invention

The present invention generally relates to apparatuses and methods for providing a user interface, and more particularly, to an apparatus and method for providing a user interface, which easily recognizes a location of a pointer controlled by a pointing device, and provide a user-friendly menu that does not interrupt a user from watching a TeleVision (TV) or a monitor, and a circularly rotating menu controlled by the pointing device.

2. Description of the Related Art

Infrared light detecting remote control units using a 4-direction input method are being developed as input devices for a TV. A pointing device is used as one of the infrared light detecting remote control units.

Examples of the pointing device include, a direct pointing device, wherein a pointer is activated at a location directed by the pointing device, and an indirect pointing device, wherein a pointer is activated regardless of a direction indicated by the pointing device. The purpose of such devices can be to control a TV menu.

SUMMARY OF THE INVENTION

The present invention provides an apparatus and method for providing a user interface, which easily recognizes a location of a pointer controlled by a pointing device and does not interrupt a user from viewing a TV or a monitor.

The present invention also provides an apparatus and method for providing a user interface, which provides a circularly rotating menu that is controlled by a pointing device.

According to an aspect of the present invention, a method of providing a user interface is provided, including receiving a motion signal from a pointing device including a pointing function for moving a pointer, while the pointer is not generated on a display screen; generating the pointer when it is determined, based on the received motion signal, that the pointing device is moved in a predetermined form; displaying the generated pointer on the display screen; and providing a menu on at least one corner of the display screen.

According to another aspect of the present invention, an apparatus for providing a user interface is provided, including a display unit: a communication unit for receiving a motion signal from a pointing device including a pointing function that moves a pointer, while the pointer displayed on a screen of the display unit is not generated; and a control unit for generating and displaying the pointer on the screen, and providing a menu on at least one corner of the screen, when it is determined, based on the motion signal, that the pointing device is moved in a predetermined form.

According to another aspect of the present invention, a method of providing a user interface is provided, including receiving a motion signal from a pointing device including a pointing function for moving a pointer displayed on a display screen; checking a location of the pointer according to the motion signal; and providing a circularly rotating menu including items indicating a predetermined setup item at a corner of the display screen, when it is determined that the location is within a predetermined range from the corner.

According to another aspect of the present invention, an apparatus for providing a user interface is provided, including a display unit; a communication unit for receiving a motion signal from a pointing device including a pointing function that moves a pointer displayed on a screen of the display unit; and a control unit for providing a circularly rotating menu including items indicating a predetermined setup item at a corner of the screen, when it is determined, based on the motion signal, that a location of the pointer is within a predetermined range of the corner of the screen.

BRIEF DESCRIPTION OF THE DRAWINGS

The above and other features and advantages of the present invention will become more apparent by describing specifically embodiments thereof with reference to the attached drawings in which.

DETAILED DESCRIPTION OF EMBODIMENTS OF THE PRESENT INVENTION

Hereinafter, the present invention will be described more fully with reference to the accompanying drawings, in which embodiments of the invention are shown.

Figure 1:
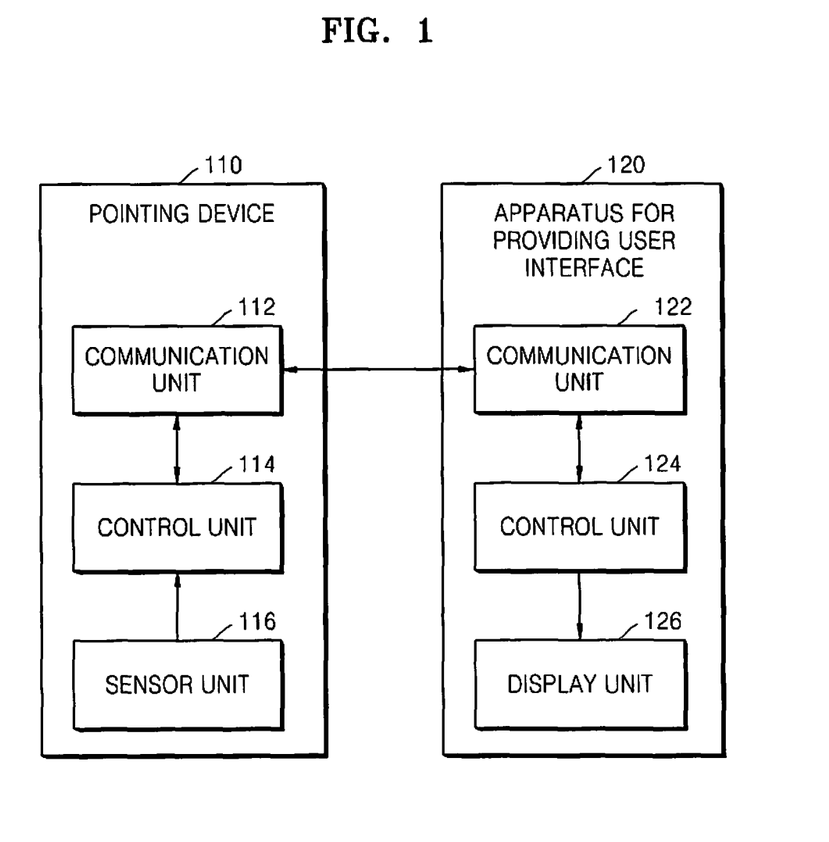
FIG. 1 is a block diagram illustrating an apparatus for providing a user interface, according to an embodiment of the present invention.

FIG. 1 is a block diagram illustrating an apparatus 120 for providing a user interface, according to an embodiment of the present invention.

Referring to FIG. 1, a pointing device 110 includes a communication unit 112, a control unit 114, and a sensor unit 116, and the apparatus 120 includes a communication unit 122, a control unit 124, and a display unit 126.

The pointing device 110 detects the motion of a user by using the sensor unit 116, and controls a pointer, for example a cursor, on a screen of the display unit 126.

The sensor unit 116 includes an inertial sensor, such as a gyro sensor and/or an acceleration sensor, which converts motion into an electric signal. The pointing device 110 transmits the signal obtained from the sensor unit 116 to the apparatus 120 through the control unit 114 and the communication unit 112.

Although not illustrated in FIG. 1, the pointing device 110 may further include buttons so that the device may be used as a remote control unit.

While the pointer is not generated on the screen of the display unit 126, the communication unit 122 of the apparatus 120 receives a predetermined motion signal according to the motion of the pointing device 110 from the communication unit 112 of the pointing device 110 by transmitting the predetermined motion signal to the control unit 114.

When it is determined that the pointing device 110 has been moved in a predetermined form based on the motion signal, the control unit 124 of the apparatus 120 generates or activates the pointer to display the pointer on the screen of the display unit 126. When the pointer is generated unintentionally, i.e., by touching the pointing device 110 by mistake, a user may be interrupted while watching a TV or a monitor. Accordingly, the apparatus 120, according to the current embodiment of the present invention, generates the pointer in response to a preset situation, i.e., an interaction such as a specific gesture, which is input by the user.

FIGS. 2A to 2D are diagrams illustrating specific gestures of the user in order to generate a pointer.

Figure 2A:
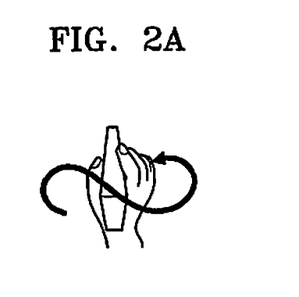
FIGS. 2A to 2D are diagrams illustrating gestures of a user for generating a pointer.
Figure 2B:
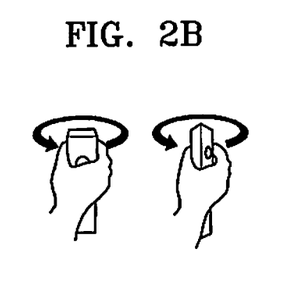
Figure 2C:
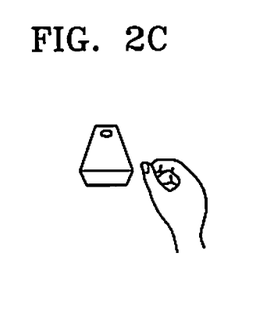
Figure 2D:
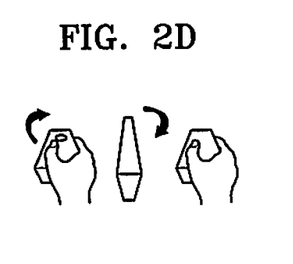

FIGS. 2A to 2D show examples of predetermined gestures made by the user, wherein the control unit 124 generates the pointer when the received motion signal is recognized as one of the predetermined gestures shown in FIGS. 2A through 2D. FIG. 2A shows a gesture in which the user tilts the pointing device 110 right and left once, FIG. 2B shows a gesture in which the user makes a circular motion with the pointing device 110, FIG. 2C shows a gesture in which the user lightly taps the pointing device 110, and FIG. 2D shows a gesture in which the user turns the pointing device 110 upside down. Such predetermined gestures may be set by a manufacturer of the apparatus 120, or the user, and are not limited to the examples shown in FIGS. 2A to 2D. Although not illustrated in FIGS. 2A through 2D, information about the predetermined gestures is stored in a storage unit.

The control unit 124 generates the pointer at a center of the screen of the display unit 116. Generally, when the pointer is generated at a certain location, it is not easy for the user to determine at which location the pointer has been generated. Accordingly, the user easily determines the location of the pointer since the pointer is generated at the center of the screen in the current embodiment of the present invention.

Alternatively, the control unit 124 may change a size of the generated pointer for a predetermined time, so that the user easily finds the generated pointer. For example, the control unit 124 may enlarge the size of the pointer for the predetermined time, and gradually decrease the size, or repeatedly change the size of the pointer.

Alternatively, the control unit 124 may generate the pointer such that it blinks on the screen for a predetermined time, i.e., may generate the pointer and repeatedly turn the pointer on and off so that the user may easily find the generated pointer.

Alternatively, the control unit 124 may change the color of the generated pointer for a predetermined time so that the user may easily find the generated pointer. For example, the control unit 124 may generate a pointer having a color which is complementary to a color of the screen where the pointer has been generated, or change the color of the pointer to be easily visible. The color of the pointer may change into a predetermined color after a predetermined time.

In order to notify the user that the pointer has been generated, the control unit 124 may generate a predetermined audio signal by transmitting the predetermined audio signal to a speaker (not shown) connected to the apparatus 120, or to the pointing device 110 through the communication unit 122. Upon receiving the predetermined audio signal, the speaker or the pointing device 110 may output the predetermined audio signal.

Alternatively, in order to notify the user that the pointer has been generated, the control unit 124 may generate a vibration control signal in order to make the pointing device 110 vibrate by transmitting the vibration control signal to the pointing device 110 through the communication unit 122. Upon receiving the vibration control signal, the pointing device 110 may vibrate by using a vibration output unit (not shown).

After the pointer is generated, the control unit 124 moves the pointer, for example, a cursor, according to the received motion signal. Specifically, the control unit 124 calculates the coordinates of a pointer from the motion signal and moves the pointer to the calculated pointer coordinates.

The control unit 124 provides a menu on at least one corner of the screen of the display unit 126. The number of provided menus is not limited so long as the number is less than or equal to a number of corners of the screen. For example, a TV or a monitor generally has a rectangular shape. Thus, a number of edges and corners of the TV or monitor is 4. Thus, in the case of a TV or monitor, the control unit 124 may provide 4 or less menus. The shape of the provided menu is not limited. According to a current embodiment of the present invention, the control unit 124 may provide a menu having a circular shape. When the shape of the screen of the display unit 126 is rectangular, the control unit 124 may provide a quarter of a circle menu at each corner of the screen. When the pointer approaches a predetermined range of the generated menu, the control unit 124 activates the menu in a direction from which the pointer is approaching.

Figure 3:
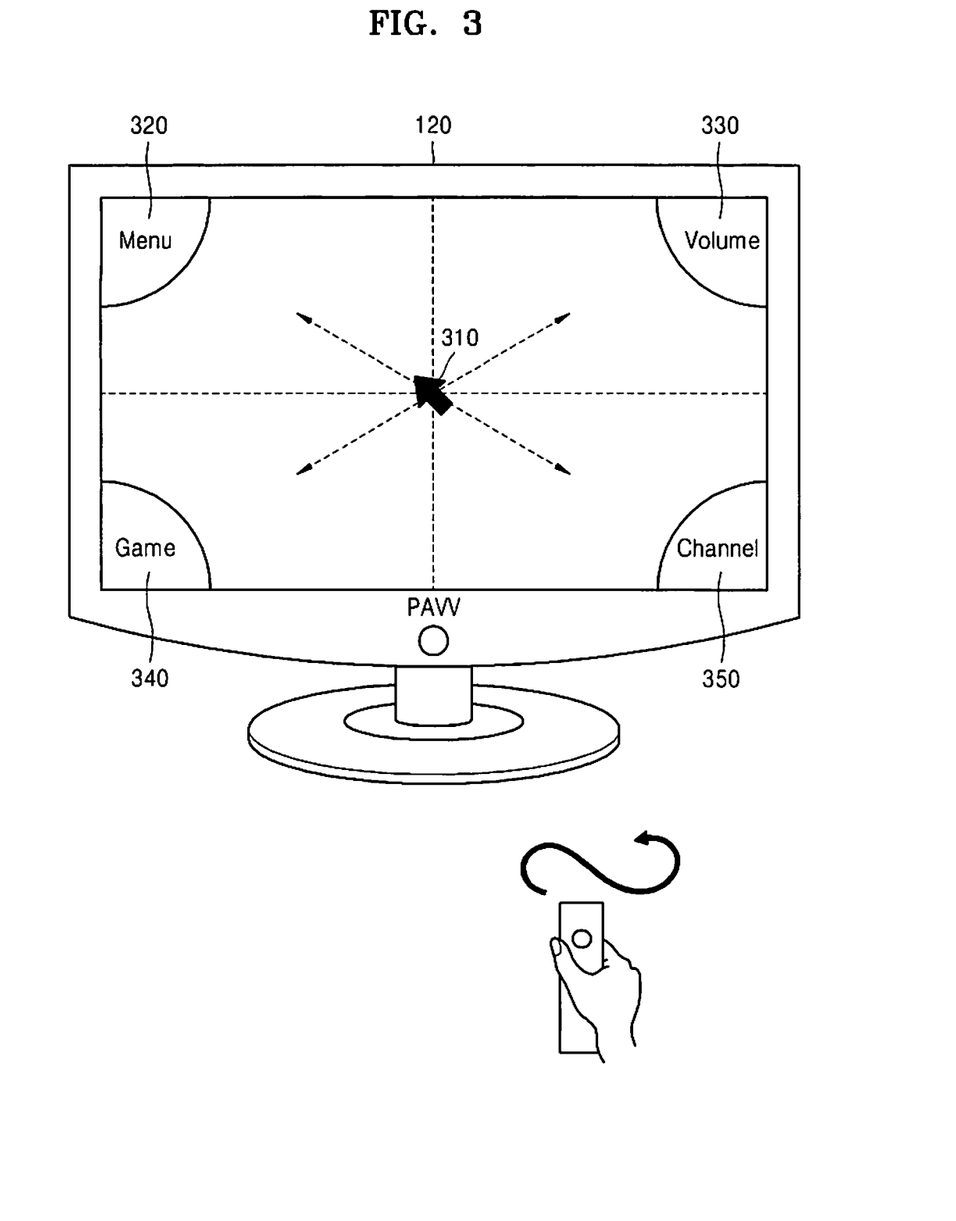
FIG. 3 illustrates a menu provided by an apparatus for providing a user interface, according to an embodiment of the present invention.

FIG. 3 illustrates a menu provided by the apparatus 120, according to an embodiment of the present invention.

Referring to FIG. 3, the apparatus 120 provides menus 320 through 350 having quarter circle shapes on corners of the screen. When a pointer 310 moves to a second quadrant according to the manipulation of the pointing device 110, the menu 320 provided at the corner of the second quadrant is activated.

The control unit 124 provides a first menu including a plurality of first items indicating a predetermined setup item on one corner of the screen of the display unit 126. The first items are application items, executable in a device, for example, a TV. For example, the first items may be a TV program, a game, a picture, music, a video, and the Internet.

The control unit 124 provides a second menu including a plurality of second items for controlling an attribute of a currently activated first item from among the first items, on another corner. For example, when the currently activated first item is a TV, the second items may be items for controlling the TV, such as the channel setting, the volume setting, and the like. In other words, the second menu is a child menu of the first menu.

The control unit 124 provides a third menu including any one of the first items, based on a user selection through the pointing device 110. The third menu is a type of hotkey region for putting one of the first items constituting the application items. The pointing device 110 also provides a fourth menu including any one of the second items, based on a user selection through the pointing device 110. The fourth menu is a type of hotkey region for putting one of the second items. The first and second items may be provided in a Graphic User Interface (GUI) form.

Figure 4:
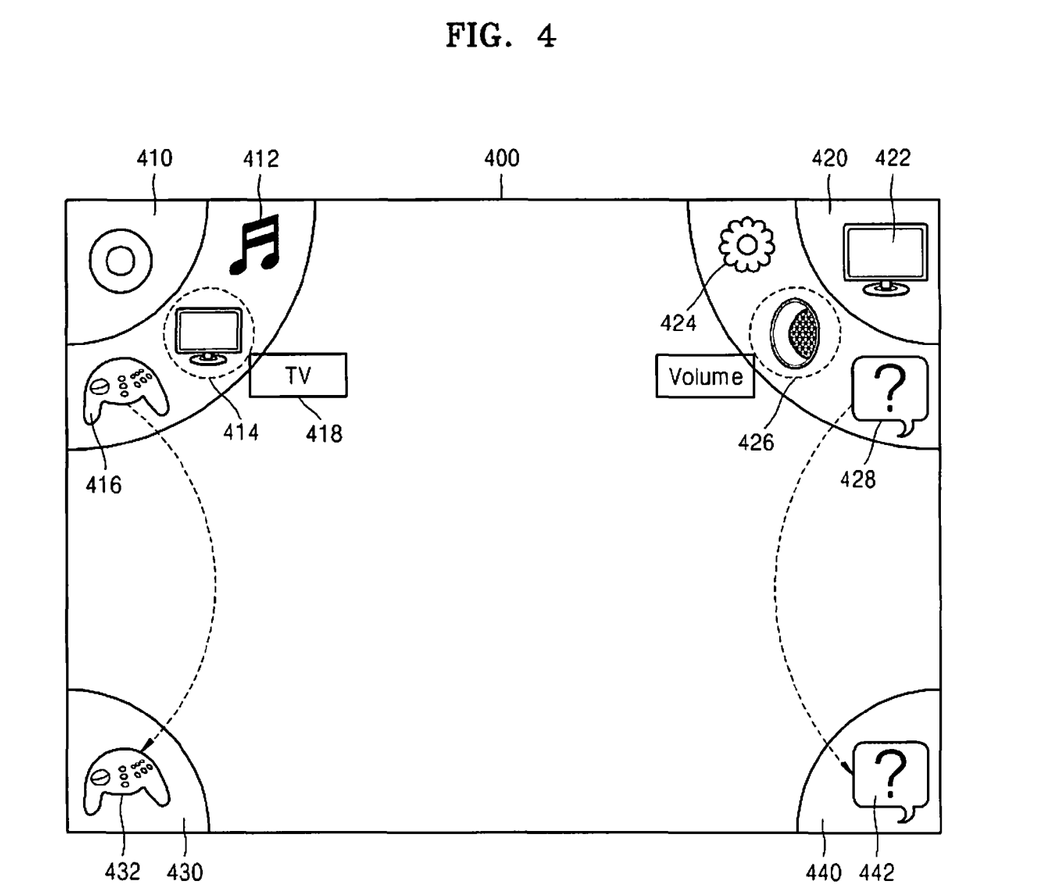
FIG. 4 illustrates a menu provided by an apparatus for providing a user interface, according to another embodiment of the present invention.

FIG. 4 illustrates a menu provided by an apparatus for providing a user interface, according to another embodiment of the present invention.

Referring to FIG. 4, menus 410 through 440 are displayed on a screen 400 of a display unit of a Digital TeleVision (DTV). The upper left menu 410 includes items about applications provided by the DTV. The upper left menu 410 shows an item 412 about a music application, an item 414 about a DTV setup application, and an item 416 about a game application, which are examples of the items about the applications provided by the DTV. If a user locates a pointer on the item 414 by using a pointing device, a text 418 about the item 414 may be displayed. The upper right menu 420 is a child menu of the upper left menu 410. When the user selects the item 414 by using the pointing device, or the pointer is on a location of the item 414, the upper right menu 420 displays an item 422 about the DTV setup application, a channel setup item 424, a volume setup item 426, and an additional setup item 428, which control an attribute of the DTV setup application. Alternatively, the upper right menu 420 may display the item 414 to show that the upper right menu 420 is a menu related to the DTV setup application. If the user locates the pointer on the volume setup item 426 by using the pointing device, the text 418 about the volume setup item 426 may be displayed. The lower left menu 430 and the lower right menu 440 may respectively include any one of the items included in the upper left menu 410, and any one of the items included in the upper right menu 420 according to setting by the user. Alternatively, the user may drag an item in the upper left or right menu 410 or 420 by using the pointing device to the lower left or right menu 430 or 440. In FIG. 4, the lower left menu 430 displays an item 432 about a game application, and the lower right menu 442 displays an additional setup item 442.

The apparatus 120 for providing a user interface, which provides a circularly rotating menu controlled by the pointing device 110, according to another embodiment of the present invention will now be described.

When it is determined that the pointing device is moved in a predetermined form based on the received motion signal while the pointer is not generated, the control unit 124 generates or activates the pointer and displays the pointer on the screen of the display unit 126. When the pointer is generated unintentionally, i.e., by touching the pointing device 110 by mistake, a user may be interrupted while watching a TV or a monitor. Accordingly, the apparatus 120, according to the current embodiment, of the present invention generates the pointer in response to a preset situation, i.e., an interaction such as a specific gesture input by the user. Examples of specific gestures include a gesture where the user tilts the pointing device 110 right and left once, a gesture where the user makes a circle with the pointing device 110, a gesture where the user lightly taps the pointing device 110, and a gesture where the user turns the pointing device 110 over. Such specific gestures may be set by the manufacturer of the apparatus 120, or the user. The specific gestures are not limited, and information about the specific gestures may be stored in the storage unit (not shown).

The control unit 124 generates the pointer at a center of the screen of the display unit 116. Generally, when the pointer is generated at a certain location, it is not easy for the user to determine a location in which the pointer is generated. Accordingly, the user easily determines the location of the pointer because the pointer is generated at the center of the screen, in the current embodiment of the present invention.

Alternatively, the control unit 124 may change a size of the generated pointer for a predetermined time, so that the user may easily find the generated pointer. For example, the control unit 124 may enlarge the size of the pointer for a predetermined time, and gradually decrease the size, or repeatedly change the size of the pointer.

Alternatively, the control unit 124 may generate the pointer and make it blink on the screen for a predetermined time, i.e., may generate and repeatedly turning the pointer on and off so that the user may easily find the generated pointer.

Alternatively, the control unit 124 may change the color of the generated pointer for a predetermined time so that the user easily finds the generated pointer. For example, the control unit 124 may generate the pointer having a color which is complementary to a color of the screen in which the pointer is generated, or change the color of the pointer to be easily visible. The color of the pointer may change into a predetermined color after a predetermined time.

In order to notify the user that the pointer is generated, the control unit 124 may generate a predetermined audio signal, by transmitting the predetermined audio signal to the speaker (not shown) connected to the apparatus 120, or to the pointing device 110 through the communication unit 122. Upon receiving the predetermined audio signal, the speaker or the pointing device 110 may output the predetermined audio signal.

Alternatively, in order to notify the user that the pointer is generated, the control unit 124 may generate a vibration control signal for controlling the pointing device 110 to vibrate, by transmitting the vibration control signal to the pointing device 110 through the communication unit 122. Upon receiving the vibration control signal, the pointing device 110 may vibrate by using a predetermined vibration output unit (not shown).

After the pointer is generated, the control unit 124 moves the pointer, for example, a cursor, according to the received motion signal. Specifically, the control unit 124 calculates the pointing coordinates from the received motion signal, and moves the pointer to the calculated pointing coordinate. When it is determined that a location of the pointer is within a predetermined range of the corner of the display unit 126, the control unit 124 provides a circularly rotating menu, including items indicating a predetermined setup item, on the corner. Here, it is possible to activate an On-Screen display (OSD) menu at a predetermined location without having to physically push a button of the pointing device 110. A number of circularly rotating menus is not limited as long as the number is less than or equal to a number of corners of the screen of the display unit 126. For example, a TV or a monitor generally has a rectangular shape. Thus, a number of corners of the TV or monitor is 4. Here, the control unit 124 may provide 4 or less menus. The control unit 124 may provide the circularly rotating menu on the corner, wherein only a part of a circle is displayed. When the shape of the screen of the display unit 126 is rectangular, the control unit 124 may provide a quarter circle menu at each corner of the screen.

Figure 5:
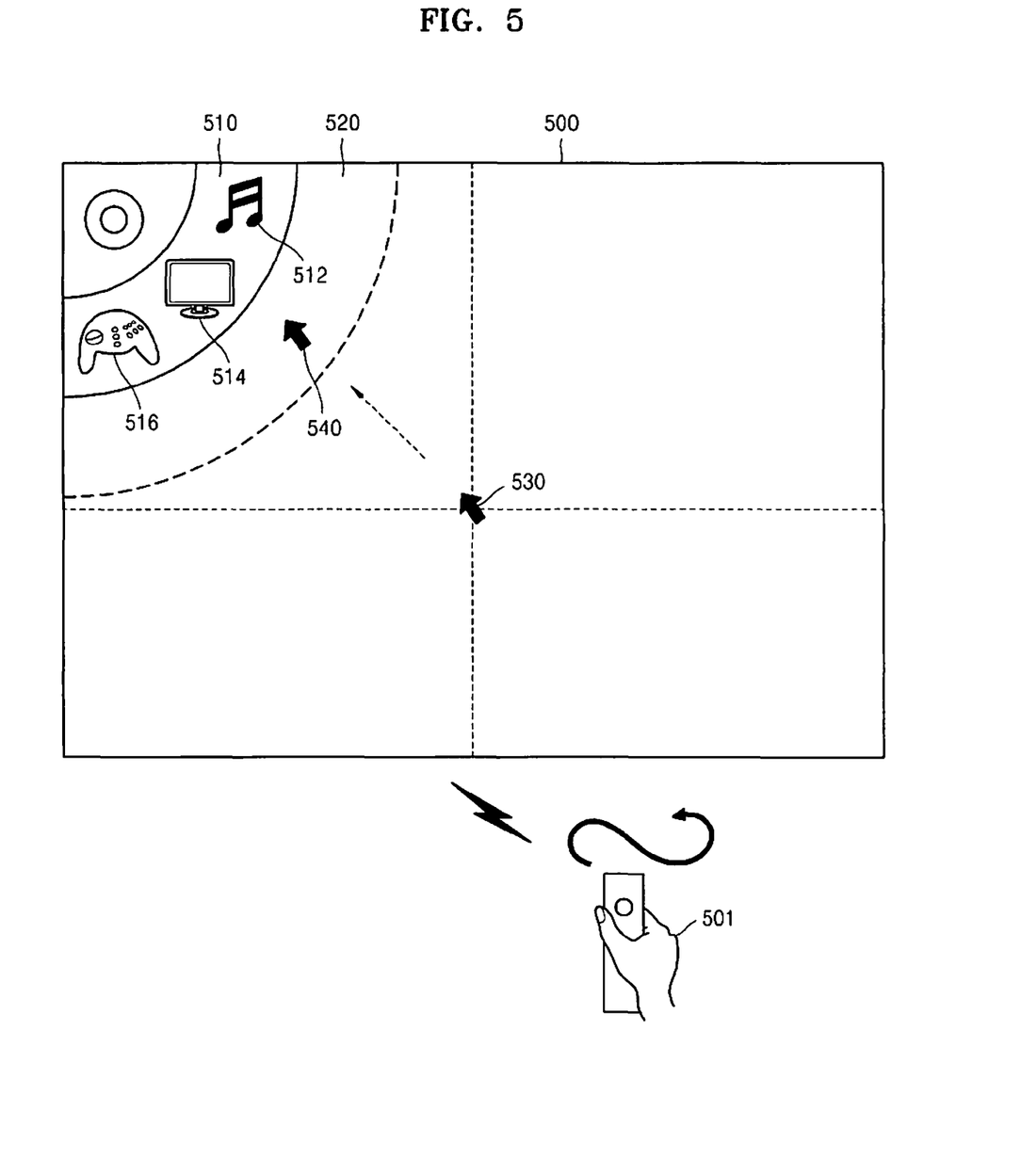
FIG. 5 illustrates a circularly rotating menu according to an embodiment of the present invention.

FIG. 5 illustrates a circularly rotating menu 510 according to an embodiment of the present invention.

Referring to FIG. 5, when a pointer 530 generated at a center of a screen 500 moves to a predetermined region 520 set from an upper left corner of the screen 500 by using a pointing device 501, i.e., when the pointer 540 is within the predetermined region 520, the circularly rotating menu 510 including items 512, 514, and 516 are activated at the upper left corner.

When the provided circularly rotating menu is a "parent" menu and an item included in the circularly rotating menu is selected according to a user selection, the control unit 124 may provide another circularly rotating menu including child items of the selected item on another corner. A selectable item may be distinguished from other items by being highlighted or displayed differently from other items. Here, a physical buttons unit (not shown) of the pointing device 110 may be selected to execute an application related to the selected item.

Figure 6:
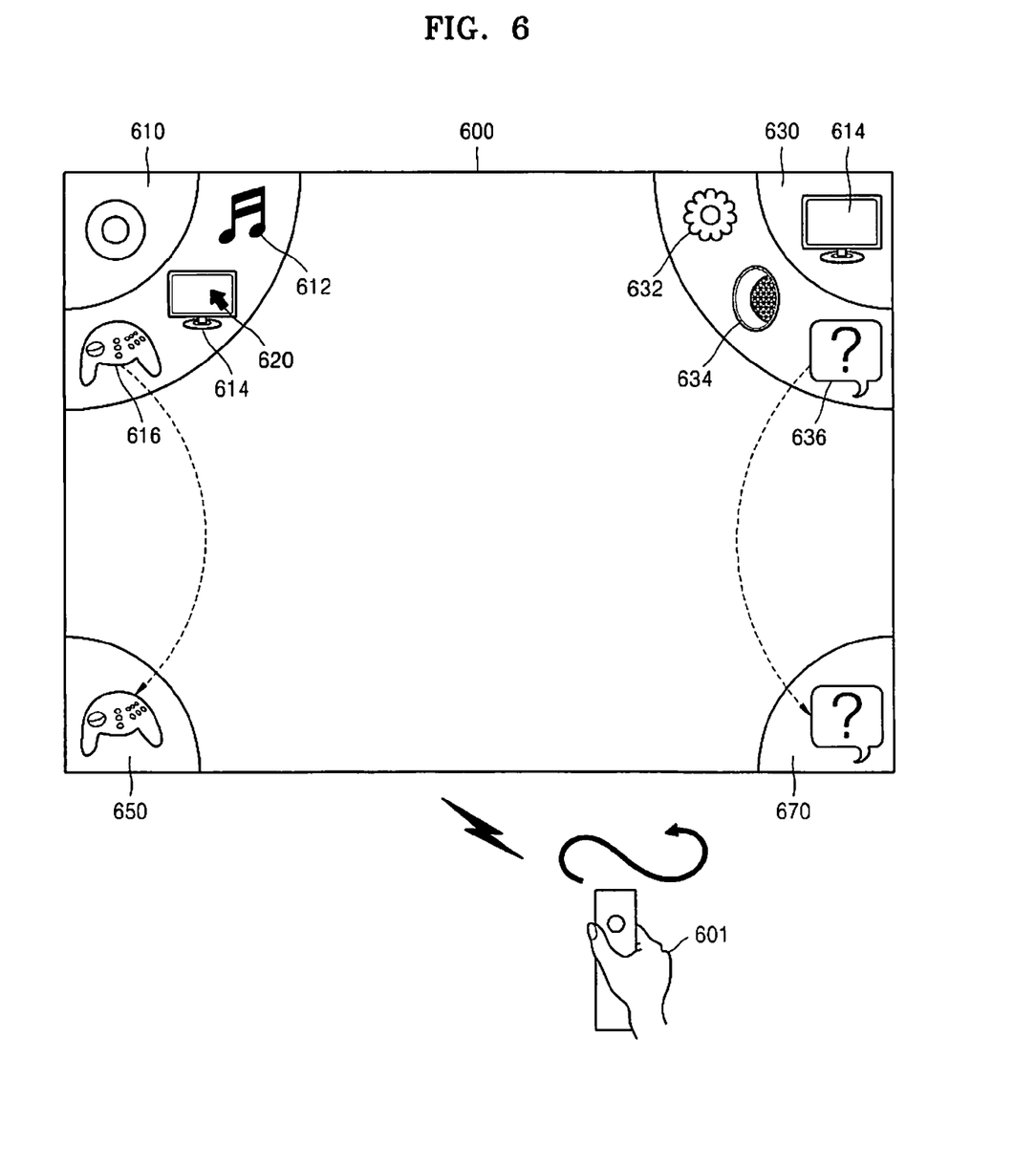
FIG. 6 illustrates a circularly rotating menu according to another embodiment of the present invention.

FIG. 6 illustrates circularly rotating menus 610 and 630 according to another embodiment of the present invention.

Referring to FIG. 6, the circularly rotating menu 610 provided on an upper left corner is a parent menu of the circularly rotating menu 630 provided on an upper right corner. When an item 614 about TV setup is selected by the user with a pointer 620 from the circularly rotating menu 610 on the upper left corner also including items 612 and 616, the circularly rotating menu 630 including child items 632, 634, and 636 related to the TV setup may be provided.

A circularly rotating menu is a menu in which items indicating a predetermined setup item are arranged in a corner region inside a circle, wherein the items rotate clockwise or counterclockwise. When the control unit 124 provides the circularly rotating menu in a quarter circle shape on any one corner, a remaining circularly rotating menu in a ¾ circle shape is displayed on a virtual screen outside the corner, based on a corner point. The remaining ¾ circle shape also includes items indicating the predetermined setup item. The items may rotate in a predetermined method, and as the items rotate, an item displayed on a peripheral region on the screen may disappear and a new item may appear on the screen. However, a shape of the circularly rotating menu is not limited thereto. Many items may be effectively displayed in a limited area. Alternatively, the control unit 124 may provide other menus 650 and 670, respectively providing any one item from among the items of the circularly rotating menus 610 and 630, based on a user selection through a pointing device 601. The other menus 650 and 670 are a type of hotkey region. The items may be provided in a GUI form.

Referring back to FIG. 1, after the circularly rotating menu is provided, the control unit 124 turns off the pointer and fixes an operation of the pointing device 110 to the circularly rotating menu. The circularly rotating menu is not controlled by the pointer of the pointing device 110, but by a predetermined operation of the pointing device 110. Accordingly, the control unit 124 rotates items of the circularly rotating menu based on the motion of the pointing device 110. The apparatus 120 according to the current embodiment of the present invention may recognize the operation of the pointing device 110 from the motion signal received from the pointing device 110. For example, the control unit 124 rotates the items of the circularly rotating menu counterclockwise when the pointing device 110 makes a counterclockwise circle or is tilted left. Such an operation of the pointing device 110, for rotating the items, may be set by the manufacturer or a user. Also, a rotating speed of the items may be changed based on a speed of moving the pointing device 110. When it is determined that a location indicated by the pointing device 110 is outside a predetermined region, the control unit 124 deactivates the circularly rotating menu and re-generates the pointer.

Figure 7:
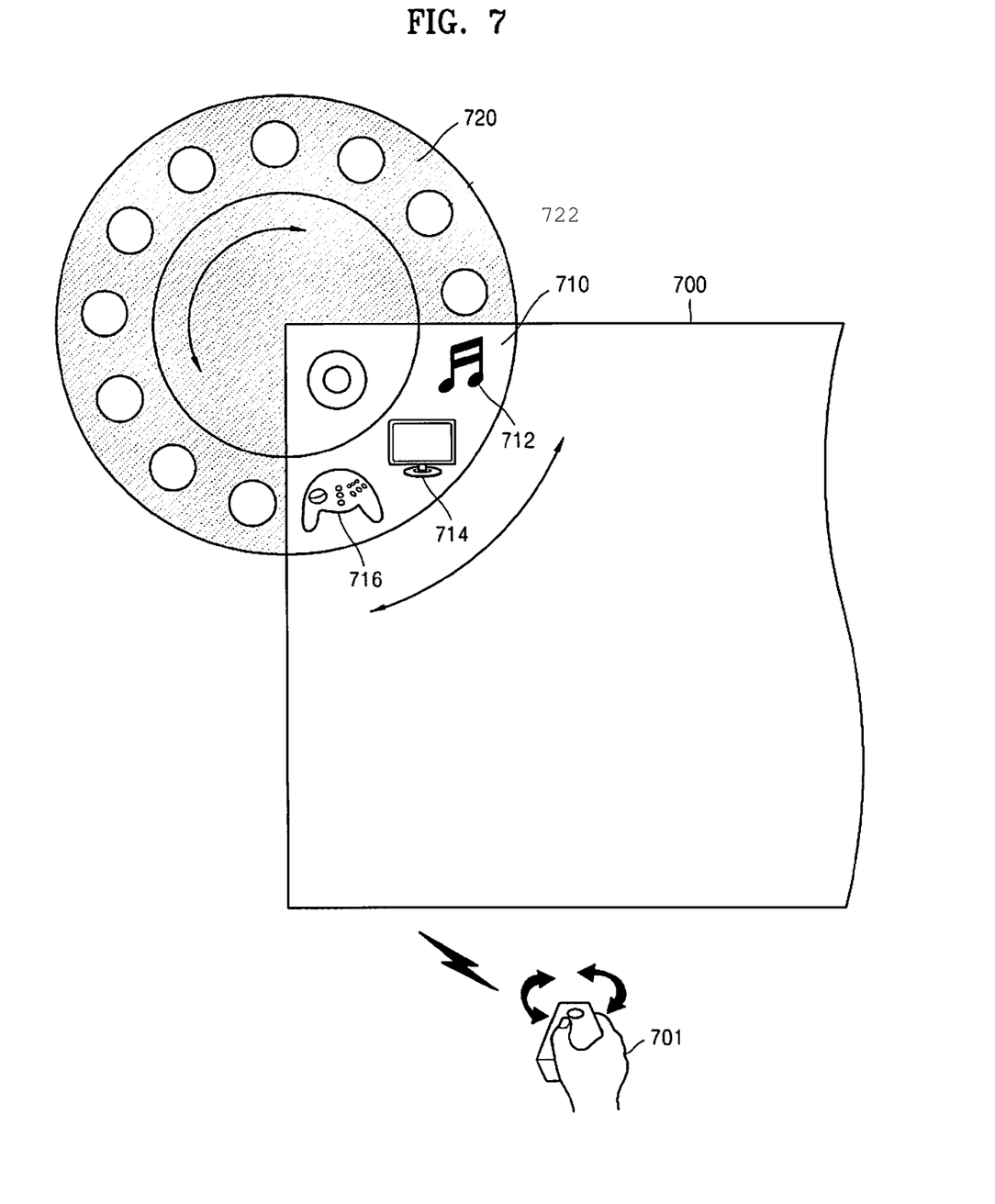
FIG. 7 illustrates a circularly rotating menu according to another embodiment of the present invention.

FIG. 7 is a diagram of circularly rotating menus 710 and 720 according to another embodiment of the present invention.

Referring to FIG. 7, the circularly rotating menu 710 in a quarter circle shape is provided on an upper left corner of a screen 700. The remaining circularly rotating menu 720 in a ¾ circle shape is displayed on a virtual screen outside the corner, based on a corner point. The circularly rotating menu 720 also includes items indicating a predetermined setup item. Items 712, 714, and 716 of the circularly rotating menus 710 and 720 may rotate according to an operation of a pointing device 701. If the items rotate clockwise, a leftmost item 716 of the circularly rotating menu 710 may disappear and an item 722 of the circularly rotating menu 720, which is nearest to a rightmost item 712 of the circularly rotating menu 710, may be displayed.

Referring back to FIG. 1, the control unit 124 may display the circularly rotating menu translucently on the screen of the display unit 126. Thus, a user may be less bothered by the interruption of the circularly rotating menu.

Figure 8:
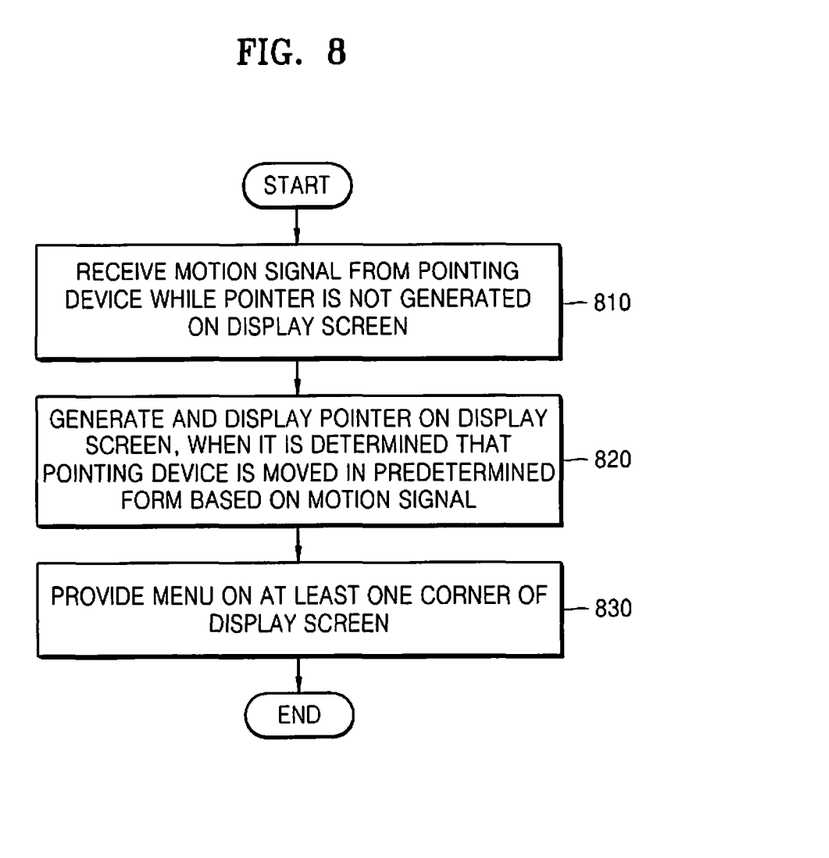
FIG. 8 is a flowchart illustrating a method of providing a user interface, according to an embodiment of the present invention.

FIG. 8 is a flowchart illustrating a method of providing a user interface, according to an embodiment of the present invention.

Referring to FIG. 8, an apparatus for providing a user interface receives a motion signal from a pointing device while a pointer is not generated on a display screen, in step 810. The pointing device detects motion of a user by using a gyro sensor or an acceleration sensor, and recognizes a pointing function or operation for moving the pointer, such as a cursor, on the display screen.

In step 820, when it is determined that the pointing device is moved in a predetermined form based on the received motion signal, the apparatus generates or activates the pointer and displays the pointer on the display screen. When the pointer is generated unintentionally, a user may be interrupted while watching a TV or a monitor. Accordingly, the apparatus according to the current embodiment of the present invention generates the pointer responsively to a preset situation, i.e., an interaction such as a specific gesture input by the user.

The apparatus generates the pointer at a center of the display screen. Generally, when the pointer is generated at a certain location, it is not easy for the user to determine a location where the pointer is generated. Accordingly, the user is able to easily determine the location of the pointer because the pointer is generated at the center of the display screen, in the current embodiment of the present invention.

Alternatively, the apparatus may change a size of the generated pointer for a predetermined time, so that the user may easily find the generated pointer. For example, the apparatus may enlarge the size of the pointer for a predetermined time, and gradually decrease the size, or repeatedly change the size of the pointer.

Alternatively, the apparatus may generate the pointer to blink on the display screen for a predetermined time, i.e., it may generate and repeatedly turn the pointer on and off so that the user easily finds the generated pointer.

Alternatively, the apparatus may change a color of the generated pointer for a predetermined time so that the user may easily find the generated pointer. For example, the apparatus may generate the pointer having a color which is complementary to a color of the display screen where the pointer is generated, or change the color of the pointer to be easily visible. The color of the pointer may change into a predetermined color after a predetermined time.

In order to notify the user that the pointer is generated, the apparatus may generate a predetermined audio signal by transmitting the predetermined audio signal to a speaker (not shown) connected to the apparatus, or to the pointing device. Upon receiving the predetermined audio signal, the speaker or the pointing device may output the predetermined audio signal.

Alternatively, in order to notify the user that the pointer is generated, the apparatus may generate a vibration control signal for controlling the pointing device to vibrate by transmitting the vibration control signal to the pointing device.

Upon receiving the vibration control signal, the pointing device may vibrate by using a predetermined vibration output unit (not shown).

In step 830, the apparatus provides a menu on at least one corner of the display screen. The number of provided menus is not limited so long as the number is less than or equal to a number of corners of the display screen. For example, a TV or a monitor generally has a rectangular shape. Thus, a number of corners of the TV or monitor is 4. Here, the apparatus may provide 4 or less menus. A shape of the provided menu is not limited. However, according to the current embodiment of the present invention, the apparatus may provide a menu having a circular shape. When the shape of the display screen is rectangular, the apparatus may provide a quarter circle menu at each corner of the screen. When the pointer approaches a predetermined range of the generated menu, the apparatus activates the menu in a direction where the pointer is approaching.

The apparatus provides a first menu including a plurality of first items indicating a predetermined setup item on one corner of the display screen. The first items are application items which are executable in a device, for example, a TV, including the apparatus. For example, the first items may be a TV program, a game, a picture, music, a video, and the Internet.

The apparatus provides a second menu including a plurality of second items for controlling an attribute of a currently activated first item from among the first items, on another corner. For example, when the currently activated first item is a TV, the second items are items for controlling the TV, such as channel setting, volume setting, etc. In other words, the second menu is a child menu of the first menu.

The apparatus provides a third menu including any one of the first items, based on a user selection through the pointing device. The third menu is a type of hotkey region for putting one of the first items constituting the application items. Also, the pointing device provides a fourth menu including any one of the second items, based on a user selection through the pointing device. The fourth menu is a type of hotkey region for putting one of the second items. The first and second items may be provided in a GUI form.

Figure 9:
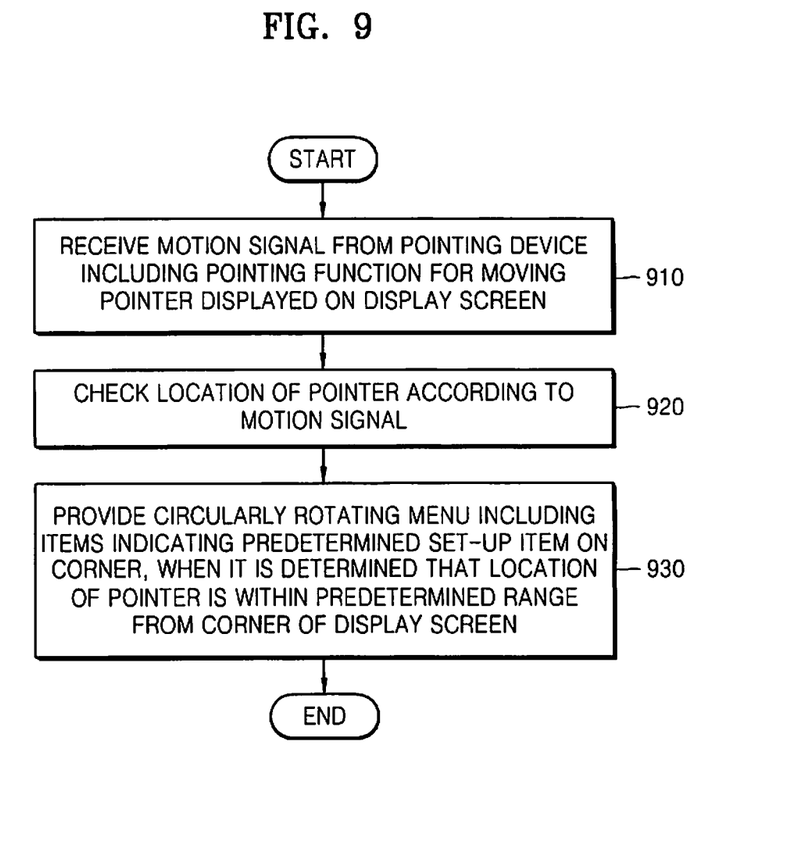
FIG. 9 is a flowchart illustrating a method of providing a user interface, according to another embodiment of the present invention.

FIG. 9 is a flowchart illustrating a method of providing a user interface, according to another embodiment of the present invention.

Referring to FIG. 9, an apparatus for providing a user interface receives a motion signal from a pointing device, in step 910. The pointing device detects motion of a user by using an inertial sensor, such as a gyro sensor and/or an acceleration sensor, and recognizes a pointing function or operation for moving a pointer, such as a cursor, on a display screen. The motion signal is a signal obtained by converting the motion of the pointing device to an electric signal.

In step 920, the apparatus checks a coordinate of a current pointer by calculating a pointing coordinate from the received motion signal.

In step 930, when it is determined that a location of the current pointer is within a predetermined range from a corner of the display screen, the apparatus provides a circularly rotating menu, including items indicating a predetermined setup item, on the corner. It is possible to activate an OSD menu at a predetermined location without having to physically push a button of the pointing device. A number of circularly rotating menus is not limited so long as the number is less than or equal to a number of corners of the display screen. For example, a TV or a monitor generally has a rectangular shape. Thus, a number of corners of the TV or monitor is 4. Here, the apparatus may provide 4 or less menus. The apparatus may provide the circularly rotating menu on the corner, wherein only a part of a circle is displayed. When the shape of the display screen is rectangular, the apparatus may provide a quarter circle menu on any corner of the screen.

When the provided circularly rotating menu is a parent menu and an item included in the circularly rotating menu is selected according to a user selection, the apparatus may provide another circularly rotating menu including child items of the selected item on another corner. A selectable item may be distinguished from other items by being highlighted or displayed differently from other items. Physical buttons unit of the pointing device may be selected to execute an application related to the selected item.

Figure 10:
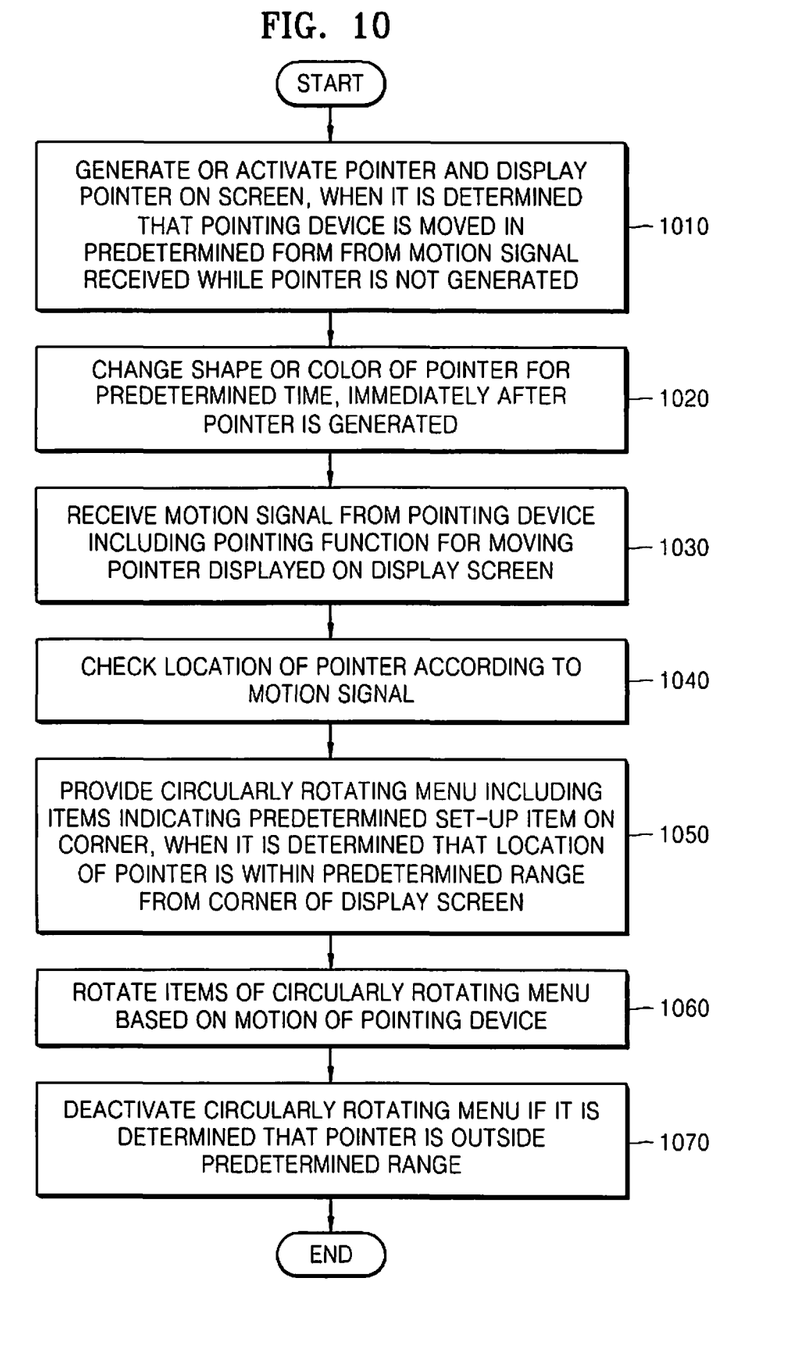
FIG. 10 is a flowchart illustrating a method of providing a user interface, according to another embodiment of the present invention.

FIG. 10 is a flowchart illustrating a method of providing a user interface, according to another embodiment of the present invention.

Referring to FIG. 10, an apparatus for providing a user interface generates or activates a pointer and displays the pointer on a screen, when it is determined that a pointing device is moved in a predetermined form based on a motion signal received while the pointer is not generated, in step 1010. When the pointer is generated unintentionally, i.e., by touching the pointing device by mistake, a user may be interrupted while watching a TV or a monitor. Accordingly, the apparatus according to the current embodiment of the present invention generates the pointer responsively to a preset situation, i.e., an interaction such as a specific gesture input by the user. Examples of the specific gesture include a gesture where the user tilts the pointing device right and left once, a gesture where the user makes a circle with the pointing device, a gesture where the user lightly taps the pointing device, and a gesture where the user turns the pointing device over. Such specific gestures may be set by the manufacturer of the apparatus, or the user. The specific gestures are not limited.

The apparatus may generate the pointer at a center of the screen. Generally, when the pointer is generated at a certain location, it may be difficult for the user to determine a location where the pointer is generated. Accordingly, the pointer is generated at the center of the screen so that the user easily determines the location of the pointer, in the current embodiment of the present invention.

In step 1020, the apparatus may change a shape or color of the generated pointer for a predetermined time, immediately following the pointer's generation. For example, the apparatus may enlarge a size of the pointer for a predetermined time and then gradually decrease the size of the pointer, or repeatedly change the size of the pointer. Alternatively, the apparatus may blink the pointer for a predetermined time on the screen, i.e., may repeatedly turn the pointer on and off, or change the color of the pointer for a predetermined time. For example, the apparatus may generate the pointer having a color which is complementary to a color of the screen where the pointer is generated, or change the color of the pointer to be easily visible. The color of the pointer may change to a predetermined color after the predetermined time. Alternatively, the apparatus may generate a predetermined audio signal by transmitting the generated audio signal to an external speaker connected to the apparatus, or to the pointing device. Upon receiving the audio signal, the external speaker or the pointing device may output the audio signal. Alternatively, the apparatus may generate a vibration control signal for controlling the pointing device to vibrate by transmitting the vibration control signal to the pointing device. Upon receiving the vibration control signal, the pointing device may vibrate by using a predetermined vibration output unit.

Since steps 1030 through 1050 are identical to steps 910 through 930 of FIG. 9, details thereof will not be repeated.

In step 1060, the apparatus rotates the items of the circularly rotating menu based on motion of the pointing device. The circularly rotating menu is a menu wherein the items indicating a predetermined setup item rotate clockwise or counterclockwise in a corner region inside a circle. When the apparatus provides the circularly rotating menu in a quarter circle shape on any one corner, a remaining circularly rotating menu in a ¾ circle shape is displayed on a virtual screen outside the corner, near the corner. The remaining circularly rotating menu also includes items indicating the predetermined setup item. The items may rotate in a predetermined method, and, as the items rotate, an item displayed on a peripheral region on the screen may disappear and a new item may appear on the screen. However, a shape of the circularly rotating menu is not limited thereto. Many items may be effectively displayed in a limited area. After providing the circularly rotating menu, the apparatus turns off the pointer, and fixes an operation of the pointing device on the circularly rotating menu. Here, the circularly rotating menu may not be controlled by the pointer of the pointing device, but may be controlled in response to a predetermined operation of the pointing device. Accordingly, the apparatus rotates the items of the circularly rotating menu based on motion of the pointing device. The apparatus, according to the current embodiment of the present invention, may recognize an operation of the pointing device from the motion signal received from the pointing device. For example, when the pointing device makes a circle counterclockwise or tilts left, the apparatus rotates the items of the circularly rotating menu counterclockwise. The operation of the pointing device for rotating the items may be set by the manufacturer or a user. Also, a rotating speed of the items may be changed according to a speed of moving the pointing device.

In step 1070, the apparatus deactivates the circularly rotating menu and re-generates the pointer, if it is determined that the location indicated by the pointing device is outside the predetermined range.

The apparatus may display the circularly rotating menu translucently on the screen. Thus, the user may be less bothered by the interruption of the circularly rotating menu.

The invention can also be embodied as computer-readable codes on a computer-readable recording medium. The computer-readable recording medium is any data storage device that can store data which can be thereafter read by a computer system. Examples of the computer-readable recording medium include Read-Only Memory (ROM), Random-Access Memory (RAM), CD-ROMs, magnetic tapes, floppy disks, optical data storage devices, and the like. The computer-readable recording medium can also be distributed over network-coupled computer systems so that the computer-readable code is stored and executed in a distributed fashion. Also, functional programs, codes, and code segments for accomplishing the present invention can be easily construed by programmers skilled in the art to which the present invention pertains.

While this invention has been particularly shown and described with reference to embodiments thereof, it will be understood by those of ordinary skill in the art that various changes in form and details may be made therein without departing from the spirit and scope of the invention as defined by the appended claims and their equivalents. The embodiments should be considered in descriptive sense only and not for purposes of limitation. Therefore, the scope of the invention is defined not by the detailed description of the invention but by the appended claims and their equivalents, and all differences within the scope will be construed as being included in the present invention.

What is claimed is:

1. A method of providing a user interface, the method comprising:
    receiving a motion signal from a pointing device, while a pointer is not generated on a display screen;
    determining a movement pattern based on the motion signal;
    comparing the determined movement pattern with a prestored movement pattern;
    generating the pointer in a center of the display screen when the determined movement pattern is identified with the prestored movement pattern;
    providing a first circularly rotating menu in a quarter-circle shape in a first corner of the display screen, the first circularly rotating menu comprising a first plurality of items;
    rotating the first plurality of items of the first circularly rotating menu based on a motion of the pointing device; and
    displaying a second circularly rotating menu in a quarter-circle shape in a second corner of the display screen upon selection of one of the first plurality of items, the second circularly rotating menu comprising a second plurality of items, each of the second plurality of items controlling a respective attribute of the one of the first plurality of items;
    displaying a first hot key corresponding to another of the first plurality of items in a third corner of the display screen;
    displaying a second hot key corresponding to one of the second plurality of items in a fourth corner of the display screen.

2. The method of claim 1, wherein generating the pointer further comprises:
    after generating the pointer, changing a size of the pointer for a predetermined time.

3. The method of claim 1, wherein generating the pointer further comprises:
    after generating the pointer, repeatedly turning the pointer on and off on the display screen for a predetermined time.

4. The method of claim 1, wherein generating the pointer comprises:
    changing a color of the pointer.

5. The method of claim 1, wherein generating the pointer comprises:
    generating a predetermined audio signal when the pointer is generated; and
    transmitting the predetermined audio signal to a speaker connected to an apparatus for providing a user interface, or to the pointing device.

6. The method of claim 1, wherein generating the pointer comprises:
    generating a vibration control signal for controlling the pointing device to vibrate when the pointer is generated; and
    transmitting the vibration control signal to the pointing device.

7. The method of claim 1, further comprising:
    activating the first circularly rotating menu when the pointer approaches a predetermined range of the first circularly rotating menu.

8. The method of claim 1, wherein
    each of the first plurality of items indicate a respective predetermined setup item.

9. The method of claim 1, wherein
    the first hot key is based on a user selection.

10. The method of claim 1, wherein the first plurality of items and the second plurality of items are provided in a Graphic User Interface (GUI) form.

11. An apparatus for providing a user interface, the apparatus comprising:
a display unit:
a communication unit;
a control unit; and
a non-transitory computer readable recording medium having recorded thereon a program for receiving a motion signal from a pointing device, while a pointer displayed on a screen of the display unit is not generated, determining a movement pattern based on the motion signal, comparing the determined movement pattern with a prestored movement pattern, generating the pointer in a center of the display screen when the determined movement pattern is identified with the prestored movement pattern, providing a first circularly rotating menu in a quarter-circle shape in a first corner of the display screen, the first circularly rotating menu comprising a first plurality of items, rotating the first plurality of items of the first circularly rotating menu based on a motion of the pointing device, displaying a second circularly rotating menu in a quarter-circle shape in a second corner of the display screen upon selection of one of the first plurality of items, the second circularly rotating menu comprising a second plurality of items, each of the second plurality of items controlling a respective attribute of the one of the first plurality of items, displaying a first hot key corresponding to another of the first plurality of items in a third corner of the display screen, and displaying a second hot key corresponding to one of the second plurality of items in a fourth corner of the display screen.

12. The apparatus of claim 11, wherein the program also changes a size of the pointer for a predetermined time.

13. The apparatus of claim 11, wherein the program also repeatedly turns the pointer on and off on the screen for a predetermined time.

14. The apparatus of claim 11, wherein the program also changes a color of the pointer for a predetermined time.

15. The apparatus of claim 11, wherein the program also generates a predetermined audio signal when the pointer is generated, and transmits the predetermined audio signal to a speaker connected to the apparatus, or to the pointing device.

16. The apparatus of claim 11, wherein the program also generates a vibration control signal for controlling the pointing device to vibrate when the pointer is generated, and transmits the vibration control signal to the pointing device.

17. The apparatus of claim 11, wherein the program also activates the first circularly rotating menu when the pointer approaches a predetermined range of the first circularly rotating menu.

18. The apparatus of claim 11, wherein each of the first plurality of items indicates a respective predetermined setup item.

19. The apparatus of claim 11, wherein the first hot key is based on a user selection.

20. The apparatus of claim 11, wherein the first plurality of items and the second plurality of items are provided in a Graphic User Interface (GUI) form.

21. A non-transitory computer-readable recording medium having recorded thereon a program for executing a method of providing a user interface, the method comprising:
receiving a motion signal from a pointing device, while a pointer is not generated on a display screen;
determining a movement pattern based on the motion signal;
comparing the determined movement pattern with a prestored movement pattern;
generating the pointer in a center of the display screen when the determined movement pattern is identified with the prestored movement pattern;
providing a first circularly rotating menu in a quarter-circle shape in a first corner of the display screen, the first circularly rotating menu comprising a first plurality of items;
rotating the first plurality of items of the first circularly rotating menu based on a motion of the pointing device;
displaying a second circularly rotating menu in a quarter-circle shape in a second corner of the display screen upon selection of one of the first plurality of items, the second circularly rotating menu comprising a second plurality of items, each of the second plurality of items controlling a respective attribute of the one of the first plurality of items;
displaying a first hot key corresponding to another of the first plurality of items in a third corner of the display screen; and
displaying a second hot key corresponding to one of the second plurality of items in a fourth corner of the display screen.

22. A method of providing a user interface, the method comprising:
receiving a motion signal from a pointing device comprising a pointing function for moving a pointer displayed on a display screen;
checking a location of the pointer according to the motion signal;
providing a first circularly rotating menu in a quarter-circle shape in a first corner of the display screen, when it is determined that the location is within a predetermined range from the first corner, the first circularly rotating menu comprising a first plurality of items, each indicating a respective predetermined setup item;
rotating the first plurality of items of the first circularly rotating menu based on a motion of the pointing device;
displaying a second circularly rotating menu in a quarter-circle shape in a second corner of the display screen upon selection of one of the first plurality of items, the second circularly rotating menu comprising a second plurality of items, each of the second plurality of items controlling a respective attribute of the one of the first plurality of items;
displaying a first hot key corresponding to another of the first plurality of items in a third corner of the display screen; and
displaying a second hot key corresponding to one of the second plurality of items in a fourth corner of the display screen.

23. The method of claim 22, further comprising:
turning off the pointer after the first circularly rotating menu is generated; and
fixing an operation of the pointing device to the first circularly rotating menu.

24. The method of claim 23, further comprising:
deactivating the first circularly rotating menu when it is determined that a location indicated by the pointing device is outside the predetermined range, and generating the pointer again.

25. The method of claim 22, further comprising:
receiving the motion signal from the pointing device while the pointer is not generated on the display screen; and generating the pointer when it is determined, based on the received motion signal, that the pointing device is moved in a predetermined form.

26. The method of claim 25, wherein generating the pointer comprises:
generating the pointer at a center of the display screen.

27. The method of claim 25, further comprising:
changing a shape or color of the pointer for a predetermined time, after the pointer is generated.

28. An apparatus for providing a user interface, the apparatus comprising:
a display unit;
a communication unit;
a control unit; and
a non-transitory computer readable recording medium having recorded thereon a program for receiving a motion signal from a pointing device comprising a pointing function that moves a pointer displayed on a screen of the display unit, providing a first circularly rotating menu in a quarter-circle shape in a first corner of the screen, when it is determined, based on the motion signal, that a location of the pointer is within a predetermined range of the first corner of the screen, the first circularly rotating menu comprising a first plurality of items, each indicating a respective predetermined setup item, rotating the first plurality of items of the first circularly rotating menu based on a motion of the pointing device, displaying a second circularly rotating menu in a quarter-circle shape in a second corner of the display screen upon selection of one of the first plurality of items, the second circularly rotating menu comprising a second plurality of items, each of the second plurality of items controlling a respective attribute of the one of the first plurality of items, displaying a first hot key corresponding to another of the first plurality of items in a third corner of the display screen, and displaying a second hot key corresponding to one of the second plurality of items in a fourth corner of the display screen.

29. The apparatus of claim 28, wherein the circularly rotating menu is displayed on the screen translucently.

30. The apparatus of claim 28, wherein the program also turns off the pointer after the first circularly rotating menu is generated, and fixes an operation of the pointing device to the first circularly rotating menu.

31. The apparatus of claim 30, wherein the program also deactivates the first circularly rotating menu and generates the pointer, when it is determined that a location indicated by the pointing device is outside the predetermined range, and generates the pointer again.

32. The apparatus of claim 28, wherein the program also receives the motion signal from the pointing device while the pointer is not generated on the display screen, and generates the pointer when it is determined, based on the motion signal, that the pointing device is moved in a predetermined form.

33. The apparatus of claim 32, wherein the program also generates the pointer at a center of the screen.

34. The apparatus of claim 32, wherein the program also changes a shape or color of the pointer for a predetermined time after the pointer is generated.

35. A non-transitory computer-readable recording medium having recorded thereon a program for executing a method of providing a user interface, the method comprising:
receiving a motion signal from a pointing device comprising a pointing function for moving a pointer displayed on a display screen;
checking a location of the pointer according to the motion signal;
providing a first circularly rotating menu in a quarter-circle shape in a first corner of the display screen, when it is determined that the location is within a predetermined range from the first corner, the first circularly rotating menu comprising a first plurality of items, each indicating a respective predetermined setup item;
rotating the first plurality of items of the first circularly rotating menu based on a motion of the pointing device;
displaying a second circularly rotating menu in a quarter-circle shape in a second corner of the display screen upon selection of one of the first plurality of items, the second circularly rotating menu comprising a second plurality of items, each of the second plurality of items controlling a respective attribute of the one of the first plurality of items;
displaying a first hot key corresponding to another of the first plurality of items in a third corner of the display screen; and
displaying a second hot key corresponding to one of the second plurality of items in a fourth corner of the display screen.

* * * * *